United States Patent [19]
Montagnino et al.

[11] Patent Number: 5,649,476
[45] Date of Patent: Jul. 22, 1997

[54] STEAM GENERATOR ASSEMBLY AND STEAM COOKING APPLIANCES USING SAME

[75] Inventors: James Montagnino; Wyley Kitzmiller, both of El Paso, Tex.

[73] Assignee: Production Engineered Designs, Inc., El Paso, Tex.

[21] Appl. No.: 506,706

[22] Filed: Jul. 25, 1995

Related U.S. Application Data

[63] Continuation-in-part of Ser. No. 292,974, Aug. 22, 1994, abandoned.

[51] Int. Cl.$^6$ .................... A47J 27/04; F22B 27/00
[52] U.S. Cl. .................... 99/415; 99/446; 126/369; 122/40; 122/31.1; 219/401
[58] Field of Search ................ 99/410, 411, 412, 99/413, 414, 415, 467, 473, 446, 330, 331, 333; 126/369, 20, 348; 122/40, 31.1; 219/401

[56] References Cited

U.S. PATENT DOCUMENTS

| | | | |
|---|---|---|---|
| 3,052,615 | 9/1962 | Johns et al. | 122/40 |
| 3,406,665 | 10/1968 | Bukau | 122/31.1 |
| 4,920,251 | 4/1990 | Whitenack et al. | 219/401 |
| 5,027,750 | 7/1991 | Boland et al. | 122/31.1 |
| 5,097,753 | 3/1992 | Naft | 99/341 |
| 5,103,076 | 4/1992 | Houkuwa | 219/401 |

*Primary Examiner*—Reginald Alexander
*Attorney, Agent, or Firm*—Watson Cole Stevens Davis, P.L.L.C.

[57] ABSTRACT

A steam generator for use in steam cooking appliances includes an inner wall which provides a boiler chamber around a core of a thermostat-controlled electric heater and an outer wall which defines a buffer chamber around the boiler chamber, the inner and outer walls including openings to enable water to flow from a water reservoir into the buffer chamber and then into the boiler chamber and for the equalization of gas pressures therebetween. The heater core provides high latent heat-continuing steam which passes upwardly into a head chamber and through discharge orifices in an end wall thereof.

18 Claims, 7 Drawing Sheets

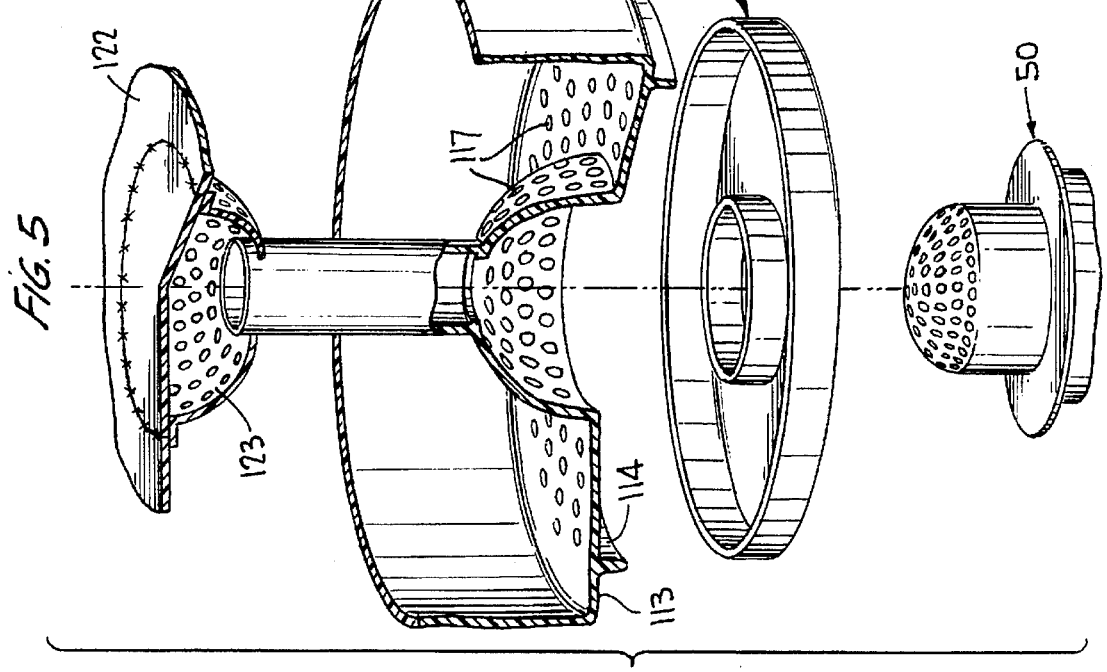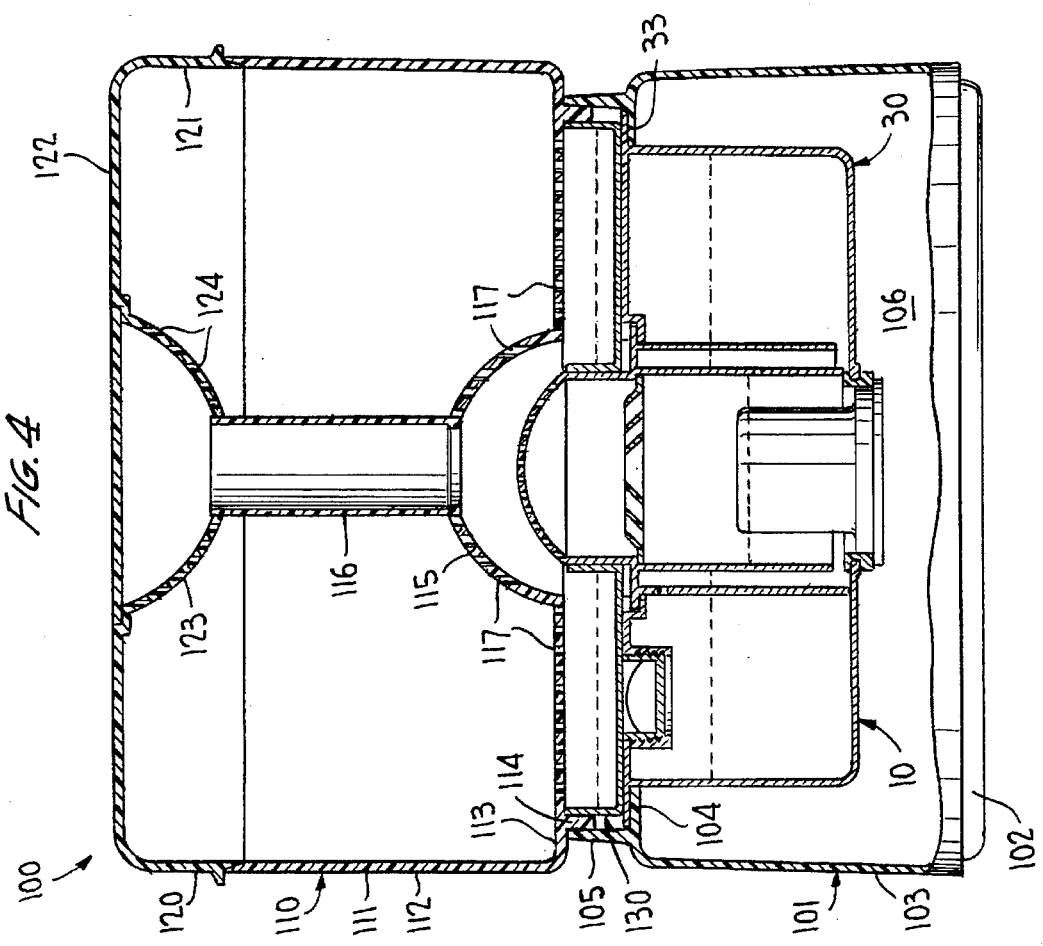

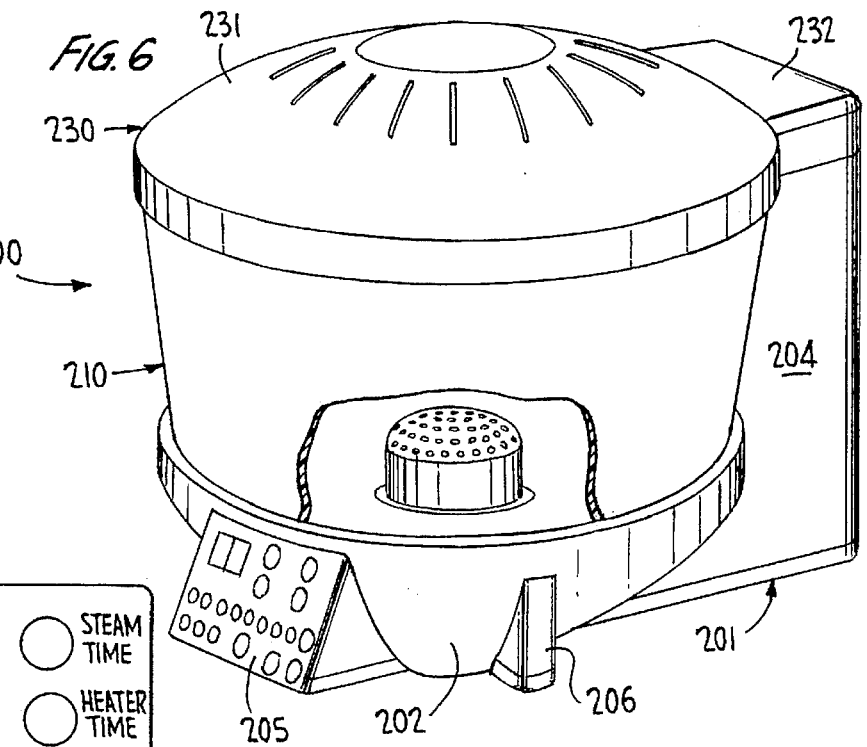

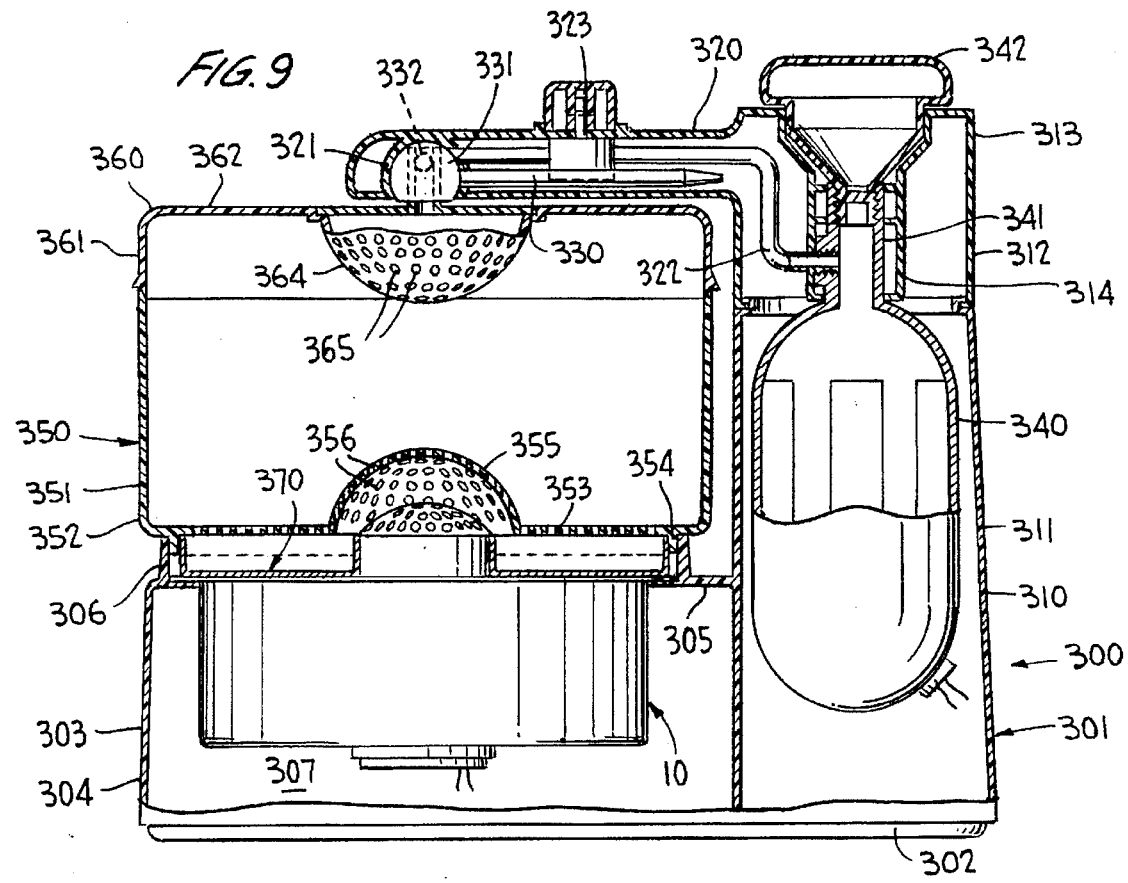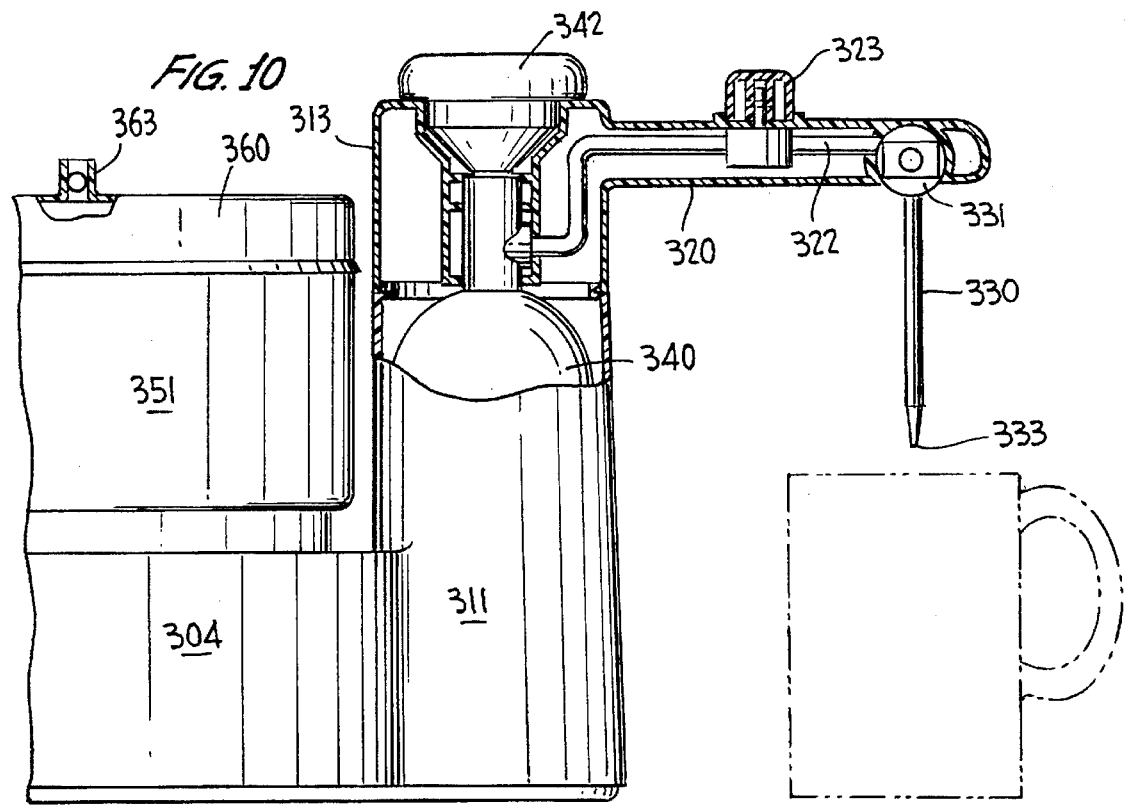

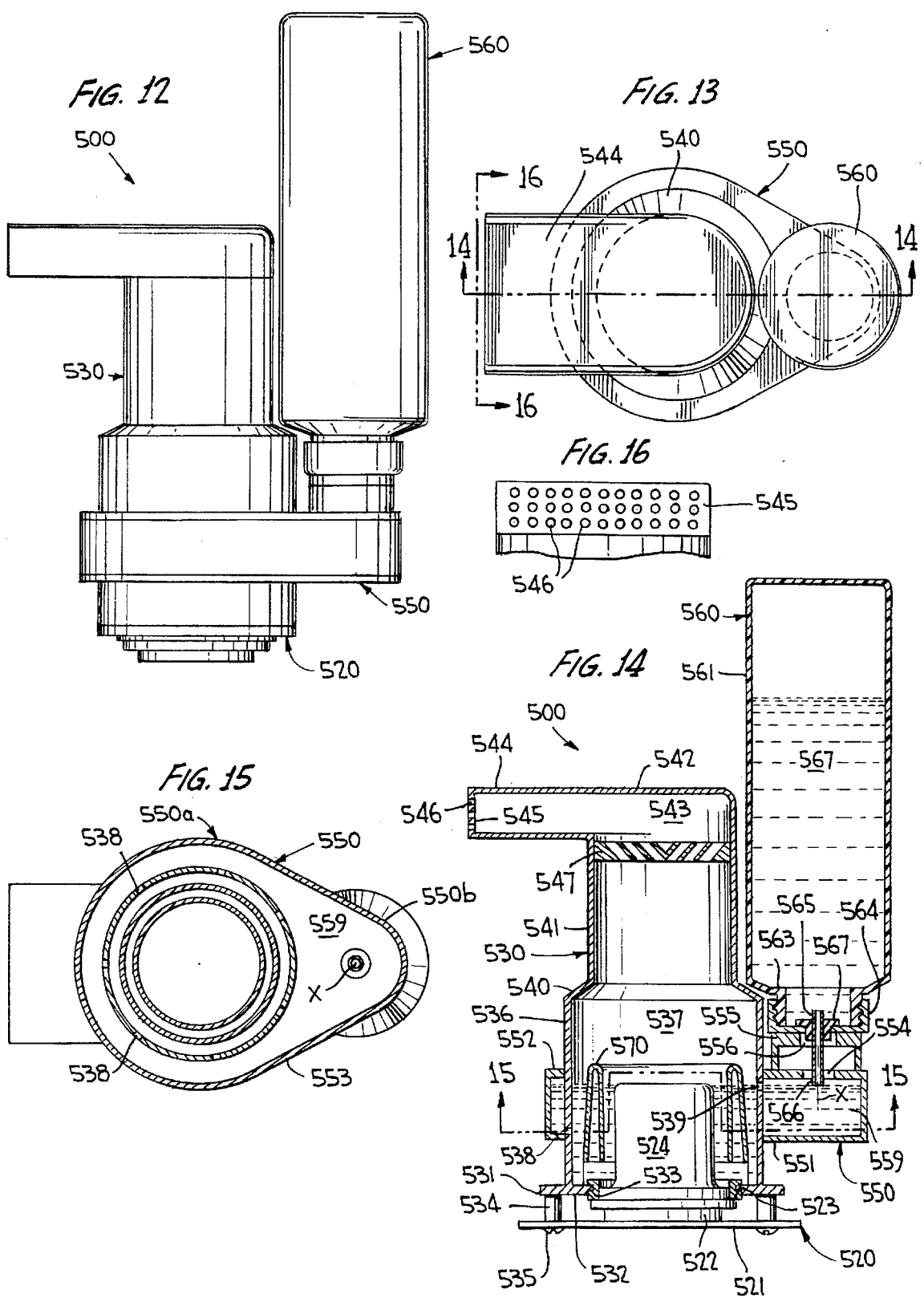

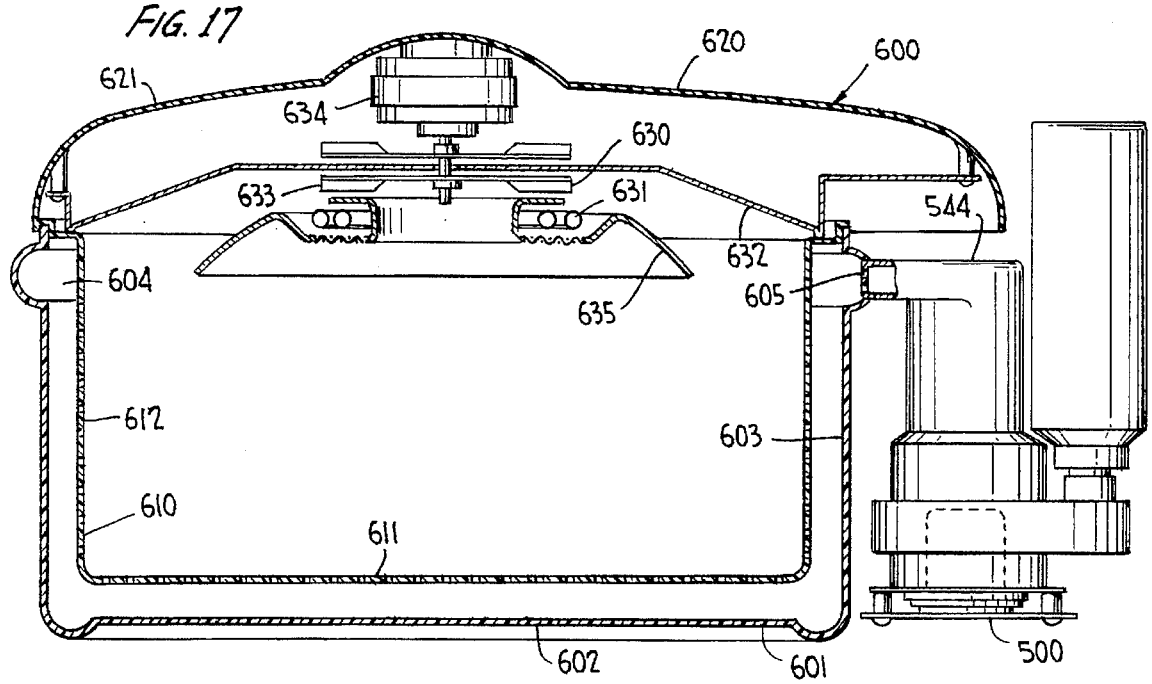
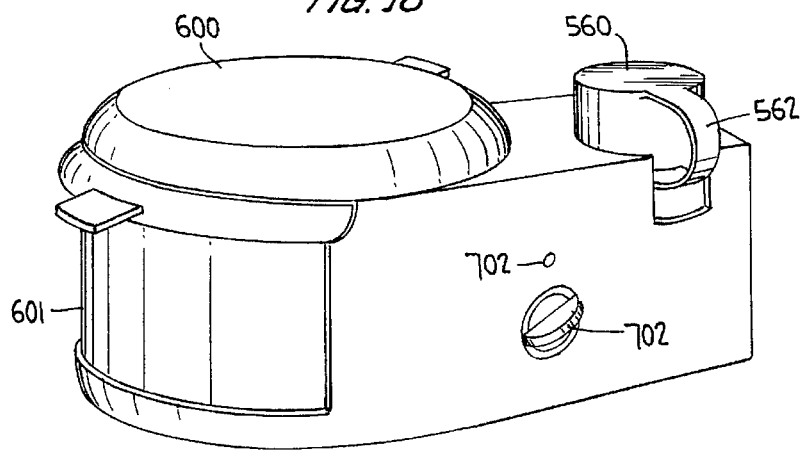

STEAM GENERATOR ASSEMBLY AND STEAM COOKING APPLIANCES USING SAME

CROSS REFERENCE TO RELATED APPLICATION

This is a continuation-in-part of application Ser. No. 08/292,974, filed Aug. 22, 1994, now abandoned.

BACKGROUND OF THE INVENTION

The present invention relates to steamer appliances for cooking foods and to steam generator devices used therein.

Steamer appliances which cook foods using steam generated therein by electric heaters are well known—see, for example, U.S. Pat. Nos. 4,920,251, 5,097,753 and 5,103,076. However, the known appliances of this type are rather slow in providing a continuous flow of steam for cooking, often times requiring 4 to 6 minutes after activation, either because the internal electric heaters must heat the entire pool of water in the appliance before steam is generated (see, e.g., U.S. Pat. No. 5,097,753), or because the small pool of water in an inner chamber provided around the heater will undergo such rapid boiling that cavitation and frothing occurs. Such cavitation and frothing reduces the amount of water around the heater and the thermostat associated with the heater will shut off electricity to the heater until it cools, causing on-and-off cycling of the heater as the water boils and is replaced by fresh, cool water from the surrounding reservoir. This cycling delays steady-state operation.

The creation of steamer appliances which can quickly generate a continuous supply of steam for cooking foods therein is very much desired.

It is an object of the present invention to provide a steam generator assembly for use in steamer appliances which can rapidly produce a continuous, steady-state supply of steam.

It is a further object of the present invention to provide such a steam generator assembly which provides steam having a high latent heat content.

It is a still further object of the present invention to provide such a steam generator assembly which can be easily disassembled for cleaning.

It is a still further object of the present invention to provide steamer appliances which include steam cooking chambers in which foods can be quickly and effectively steamed.

It is a still further object of the present invention to provide a double-dome steamer appliance which advantageously utilizes the steam generator assembly of the present invention.

It is a still further object of the present invention to provide a steam convection oven which advantageously utilizes the steam generator assembly of the present invention, and which also includes a steam superheating, self-contained electrical heater element within the steam cooking chamber.

It is a still further object of the present invention to provide a steam cooker with retractable steam rod for optionally frothing liquids in a separate container and which advantageously utilizes a steam generator assembly of the present invention.

SUMMARY OF THE INVENTION

According to the present invention a continuous flow of steam with high latent heat content for cooking foods in a steamer appliance can be quickly provided with a steam generator assembly that includes first chamber means positioned around a thermostat-controlled electric heater device so as to provide a boiler chamber around the heater device, a head chamber above the boiler chamber and an end wall with perforations therein, a second cheer means defining a buffer chamber around the boiler chamber, water reservoir means, inlet means for delivering water from the buffer chamber into the boiler chamber, vent means for equalizing gas pressures above the water levels in the boiler chamber and the buffer chamber, and means communicating the water reservoir with the buffer chamber to enable water to flow from the water reservoir into the buffer chamber and for gas to pass from the buffer chamber into the water reservoir to equalize gas pressures above the water levels therein. As the water in the boiler chamber boils and the water level falls below the vent means to the buffer chamber, the equalized gas pressures in the boiler chamber and buffer chamber will enable water from the buffer chamber to flow through the inlet means into the boiler chamber, and the means communicating the water reservoir and the buffer chamber will enable cool, fresh water from the water reservoir to flow into the buffer chamber. A steady-state boiling of water in the boiler chamber is achieved. The amount of water boiling in the water chamber will exceed the amount flowing through the discharge orifices of the first chamber means; thus, the emitted steam will have a high latent heat content.

A steam separator is advantageously positioned within the first chamber means to separate the boiler chamber from the head chamber and to retain water droplets in the boiler chamber, thereby increasing the output ratio of saturated steam to entrained hot water droplets emitted from the assembly.

In one preferred embodiment the steam generator assembly includes a steamer insert which is insertable in a water reservoir and defines a head that encloses a head chamber, an end wall with discharge orifices, and inner and outer walls which extend downwardly from the head to be positioned around an electric heater located within the water reservoir, the inner wall defining an enclosed boiler chamber around the heater and below the head chamber, and the outer wall defining a buffer chamber around the inner wall. An inlet opening is provided at the bottom of the outer wall to enable cool, fresh water to flow from the surrounding water reservoir into the buffer chamber, and an inlet opening at the bottom of the inner wall enables water to flow from the buffer chamber into the boiler chamber. A vent opening is provided at the top of the outer wall to enable pressure equalization between the gases above the water levels in the water chamber and the buffer chamber, while a vent opening is provided in the inner wall at a point generally level with the top of the heater therewithin to enable pressure equalization between the gases in the boiler chamber and in the buffer chamber when the water level in these chambers falls therebelow, thus helping to maintain water around the heater despite rapid generation of steam in the boiler chamber. As a result, cycling of heater operation and delayed reaching of steady-state operation is avoided. And to prevent the generated back pressure from driving steam into the water reservoir and heating the entire pool of water therein, the water reservoir is enclosed and its filler neck sealingly closed by a fill cap.

In another preferred embodiment of the steam generator assembly a vertical steamer tower extends upwardly around an electric heater to define a boiler chamber around the heater, a head chamber above the boiler chamber and an end wall with discharge orifices, and a distribution manifold is positioned around the steamer tower to provide a buffer chamber, the distribution manifold being elongated such that one end extends around the steamer tower and a second end is located remotely therefrom. A plurality of inlet openings circumferentially spaced around the steamer tower enable water to flow from the buffer chamber into the boiler chamber and a vent opening thereabove enables pressure equalization between gases above the water levels in the boiler chamber and the buffer chamber. A water bottle assembly acting as a water reservoir defines a water chamber and includes a pipe stem which can extend into the distribution manifold to enable cool, fresh water to flow into the buffer chamber and gas to flow from the buffer chamber into the water bottle assembly to equalize gas pressures above water levels therein.

The present invention also provides various steamer appliances for steaming foods and which can advantageously use the inventive steam generator assembly to provide the primary supply of steam of high latent heat content for cooking foods placed therein. In one case the steamer appliance makes use of a food container containing two internal domes that are connected by a tube and are perforated so that high latent heat content steam supplied to one dome can pass to the second dome and be emitted from both domes to simultaneously steam food from below and above. In another case the steamer appliance is in the form of a convection oven which includes a heater/convection fan assembly to more effectively cook the food therein. In a third case the steamer appliance includes an auxiliary steamer means for generating steam that can be used to steam food from above or to supply steam to a separate container for frothing liquids therein.

The objects and advantages of the invention will be better understood by reference to the accompanying drawings taken in conjunction with the following discussion.

BRIEF DESCRIPTION OF THE DRAWINGS

In the drawings,

FIG. 4 is a sectional side view of a double-dome steam cooker which includes the steam generator assembly as depicted in FIGS. 1–3;

FIG. 5 is an exploded perspective view of portions of certain components of the double-dome steam cooker of FIG. 4;

FIG. 6 is a perspective view of a steam convection oven which includes a steam generator assembly as depicted in FIGS. 1–3;

FIG. 7 is a sectional side view of the steam convection oven of FIG. 6;

FIG. 8 is a view of the control panel of the steam convection oven of FIG. 6;

FIG. 9 is a sectional side view of a steam cooker with retractable steamer rod which includes the steam generator assembly as depicted in FIGS. 1–3, the retractable steamer rod being shown in a retracted condition;

FIG. 10 is an enlarged side view of a portion of the steam cooker of FIG. 9, the retractable steamer rod being shown in an extended position;

FIG. 12 is a side view of a steam generator assembly according to a second preferred embodiment of the present invention;

FIG. 13 is a top plan view of the steam generator assembly of FIG. 12;

FIG. 14 is a sectional view of the steam generator assembly of FIG. 12 as seen along line 14—14;

FIG. 15 is a sectional view of the steam generator assembly of FIG. 14 as seen along line 15—15;

FIG. 16 is a view of a portion of the steam generator assembly of FIG. 13 as seen along line 16—16;

FIG. 17 is a sectional view of a steam convection oven connected to a steam generator apparatus as depicted in FIGS. 12–16, and FIG. 18 is a perspective view of a steamer appliance which includes the steam convection oven and steam generator apparatus as depicted in FIG. 17.

DETAILED DESCRIPTION OF THE PREFERRED EMBODIMENTS

Figure 1:
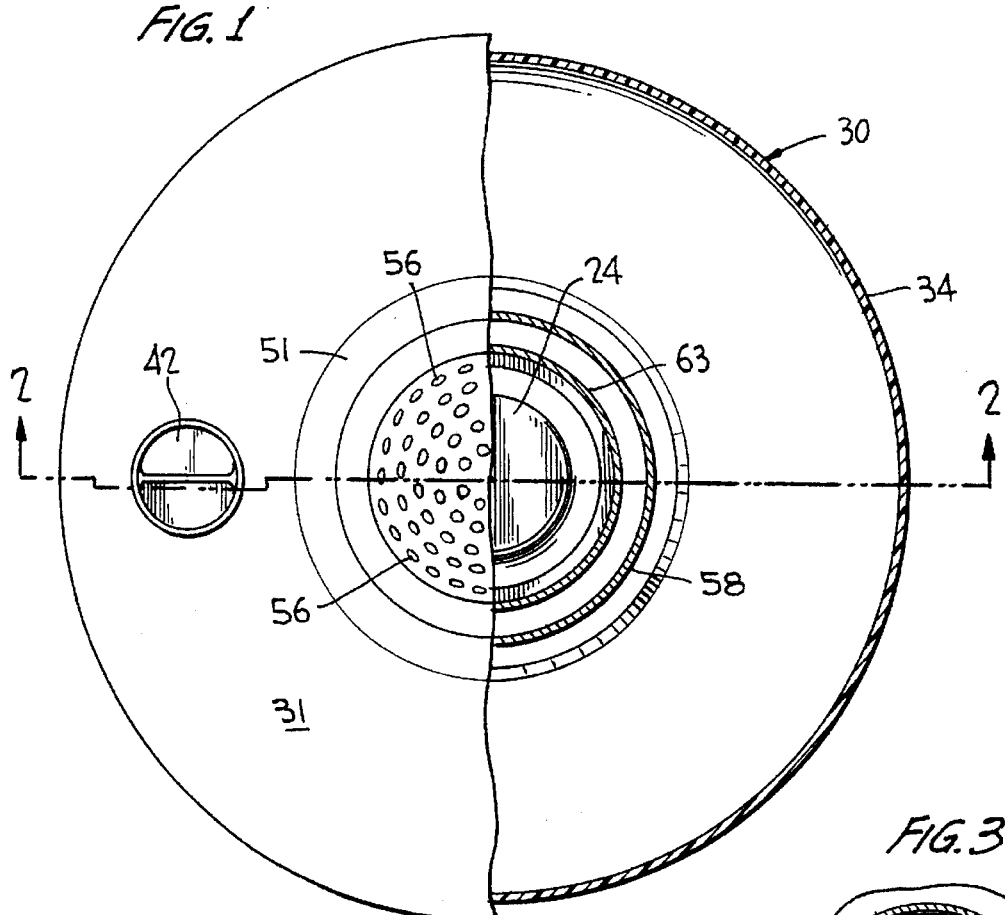
FIGS. 1 and 2 depict a steam generator assembly according to a first preferred embodiment of the present invention, FIG. 1 being a view as seen along line 1—1 of FIG. 2, and FIG. 2 being a sectional view as seen along line 2—2 of FIG. 1.
Figure 3:
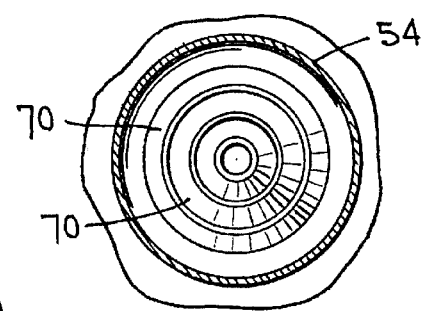
FIG. 3 is a sectional view of a portion of the steam generator assembly as seen along line 3—3 of FIG. 2.
Figure 2:
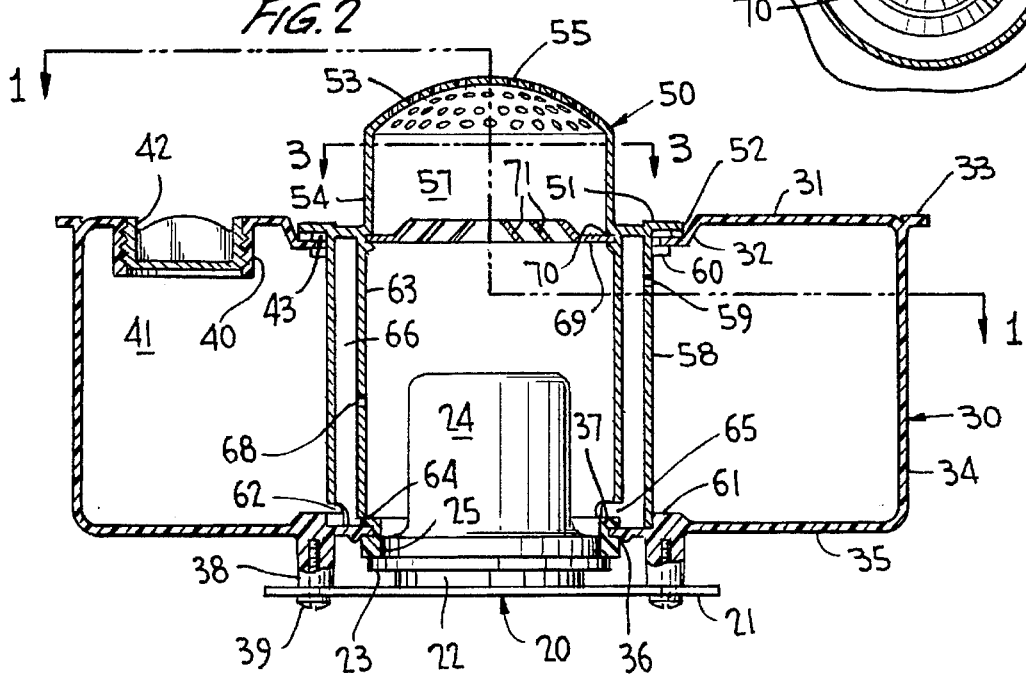

A steam generator assembly 10 constructed in accordance with a first preferred embodiment of the present invention is depicted in FIGS. 1–3. It includes a thermostat-controlled heater device 20, an annular water reservoir 30 and a steamer insert 50. In the following discussion the terms upper, lower, top, bottom, upwardly, downwardly, horizontal and vertical will be used on the assumption that the steam generator assembly is oriented in an operative position, i.e., as shown in FIG. 2.

The heater device 20 includes a disc-shaped mounting plate 21, a platform base 22 and a heater core 24. The mounting plate 21 is generally horizontally oriented and the platform base 22 is centrally connected to an upper surface thereof, while the heater core 24 is centrally mounted on an upper surface of the platform base. The heater core 24 defines a circumferential skirt 25 which is smaller in diameter than the diameter of the platform base, thus providing a circumferential ledge 23. The heater core is connectable to an electric power source by a power line (not shown).

The annular water reservoir 30, which can be made of blow molded polyethylene, includes a top wall 31 that provides a radially inwardly-extending L-shaped lip portion 32, an outer side wall 34 which extends downwardly from the top wall, a circumferential support flange 33 which extends radially outwardly from the area where the outer side wall and top wall merge, a bottom wall 35 which extends inwardly from the side wall to a circumferential inner edge 36 (the inner edge 36 is located radially inwardly of the lip portion 32), a sealing ring 37 in which the inner edge 36 extends, and circumferentially-spaced leg elements 38 which extend downwardly from the bottom wall, the leg elements mounting screws 39. The leg elements 38 are of such length that when they are connected to the mounting plate 21 by way of the screws 39 extending through corresponding circumferentially spaced holes in the mounting plate and then into the legs, the sealing ring 37 will sealingly rest in the circumferential ledge 23. The top wall 31 provides a threaded neck 40 for the supply of water to the water chamber 41 provided within the annular water reservoir, this neck being closed by a threaded fill cap 42. The L-shaped lip portion 32 includes circumferentially-spaced slots (not shown) for the bayonet connection thereto of the steamer insert 50, as well as abutment pads 43 on an upper surface thereof.

The steamer insert 50 includes an annular, generally horizontal flange 51, a head 53, an outer cylindrical wall 58 and an inner cylindrical wall 63. The flange 51 has an outer diameter such that its circumferential outer edge 52 fits within the circumferential L-shaped lip portion 32 of the water reservoir 30. The head 53 includes a cylindrical portion 54 which extends upwardly from an inner edge of the annular flange and a curved end wall (roof) 55 that contains a multiplicity of discharge orifices 56. The cylindrical portion 54 and roof 55 enclose a head chamber 57. The outer cylindrical wall 58 is located radially inwardly of the outer edge 52 of flange 51, thereby enabling the flange to seat on the L-shaped lip portion 32, and it mounts a plurality of circumferentially spaced, outwardly-extending teeth 60 which can fit through corresponding slots in the L-shaped lip portion of the water reservoir, such that the steamer insert 50 can be connected to the water reservoir 30 in bayonet fashion. The outer cylindrical wall 58 extends downwardly from the flange 51 to a lower edge 61 which contacts the bottom wall of the water reservoir, except for a circumferential portion which defines an opening 62. The inner cylindrical wall 63 extends downwardly from the flange 51 to a lower edge 64 which contacts the sealing ring 37, except for a circumferential portion which defines an opening 65 (which is diametrically opposite the opening 62). An outer annular buffer chamber 66 is formed between the outer and inner walls 58 and 63, while the inner wall defines therein an inner boiler chamber 67. A vent opening 59 is provided near the top of the outer wall 58 to enable communication between the gases above the water level in the buffer chamber 66 and the water chamber 41. A vent 68 is provided in the inner wall 63 at a level just below the top of the heater core 24 to enable pressure equalization between the gases in the inner boiler chamber and the buffer chamber and enable water delivery to the boiler chamber when the water level drops below normal operating levels. In addition, the vent provides a return path during normal operation for hot water convection currents to cirulate from the inner boiler chamber to the buffer chamber and return. A disc-like trap element 69 is mounted in a circumferential slot 70 provided between the inner wall 63 and the flange 51, the trap element including annular, upwardly tapering frusto-conical vanes 71. The trap element helps prevent water droplets entrained in steam generated in the boiler chamber 67 from passing into the head chamber 57.

With the steam generator assembly connected together as depicted in FIG. 2, water can be filled into the water chamber 41 within the water reservoir 30 via the neck 40, and the water will then pass through the opening 62 to partially fill the annular buffer chamber 66 and then through opening 65 to at least partially fill the boiler chamber 67 and surround the heater core 24. When electrical power is supplied to the heater core 24, such that it heats up, the temperature of the water in the inner boiling chamber 67 will increase, i.e., to boiling, forming steam which will fill the upper portion of the boiler chamber and pass through the trap element 69 to fill the head chamber 57. The trap element 69 will prevent most of the water droplets entrained in the steam from passing into the head chamber 57. Because the steam cannot escape from the head chamber through the discharge orifices 56 as rapidly as it is generated in the boiling chamber 67, the steam will become pressurized therein to increase its latent heat content. Thus, the steam which then escapes through the discharge orifices 56 will be capable of faster heating of foods than regular steam. And because the heater core 24 heats only the water in the inner boiler chamber and not all the water in the water reservoir, the water can be brought to a boil very quickly, e.g., in thirty seconds. Because the water reservoir is enclosed, i.e., by the top wall 31 and the cap 42, the vents 59 and 68 will enable the back pressure of the steam in the boiler chamber 67 to be equalized with the gases in the water chamber 41, thereby preventing steam from escaping back into the water chamber (and undesirably heating the water therein). The vent opening 68 enables water to flow into the boiler chamber 67 from the buffer chamber 66 when the water level in the boiler chamber drops below the top of the heater core 24.

When not in use, the steamer insert 50 can be rotated and detached from the water reservoir 30 and the trap element can be flexed and removed from the slot 69 to enable the various elements of the steam generator assembly to be cleaned.

FIGS. 4 and 5 depict a double-dome steamer appliance 100 which includes the steam generator assembly 10 according to the present invention. The steamer appliance includes a bottom housing 101 which supports the steam generator assembly 10, a food container 110, and an annular juice tray 130. The bottom housing 101 includes a base 102 which is positionable on a counter or table top, a cylindrical side wall 103, a radially-inwardly extending rim 104, and circumferential support flange 105 which extends upwardly from the rim 104. The bottom housing encloses a bottom housing chamber 106. The rim 104 supports the flange 33 of the steam generator assembly 10, such that the annular water reservoir 30 is suspended within the bottom housing chamber 106.

The food container 110 includes a lower housing part 111 and an upper housing part 120. The lower housing part 111 includes a cylindrical side wall 112, a floor 113 and a circumferential support flange 114 which extends downwardly from the floor 113 to fit within the circumferential support flange 105 of the bottom housing 101. Extending upwardly from the middle of the floor 113 is a bowl-shaped dome 115, and extending vertically upwardly from the center of the top of the dome is a tube 116. The floor 113 within the support flange 114 and the dome 115 include holes 117 for the passage of high latent heat content steam and liquids therethrough. The upper housing part 120 includes a cylindrical side wall 121, a ceiling 122, and a bowl-shaped dome 123, which is sonically welded to and extends downwardly from the middle of the ceiling and has an opening in the middle of its bottom. The cylindrical side wall 121 is positionable on the cylindrical side wall 112 to form a stable unit and the opening in the bottom of the dome 123 is sized to fit around the upper end of the tube 116. The dome 123 contains openings 124 for the passage of high latent heat content steam therethrough.

The annular juice tray 130 fits between the cylindrical portion 54 of the head of the steam generator assembly and the circumferential support flange 114 of the top housing 110. It collects juices and condensate which drain downwardly through the holes 117 from foods located within the lower housing part 111 and evenly treated from below and above by the steam of high latent heat content from the steam generator assembly 100 and simultaneously applied thereto from the holes in the domes 115 and 123.

FIGS. 6–8 depict a steam convection oven 200 which includes a steam generator assembly 10 according to the present invention. The steam convection oven includes a support housing 201 which supports the steam generator assembly 10, a container 210 which is positionable on the support housing and above the steam generator assembly, a food basket 220 which is positionable within the container 210, and a lid housing 230 which is positionable over the container and which mounts a heater/convection fan assembly 240.

The support housing 201 includes a bowl portion 202 having an inwardly-extending top rim 203, a rear tower portion 204, a front panel portion 205, and side support brackets 206. The top rim 203 supports the flange 33 of the steam generator assembly 10 such that its water reservoir 30 is suspended within a bottom chamber 207 defined within the bowl portion 202. As shown in FIG. 8, the front panel portion 205 includes control buttons for controlling the operation of the oven.

The container 210, which is preferably made of a transparent, heat resistant material such as glass, includes a floor 211 that defines a central opening 212 through which the head of the steam generator assembly 10 can extend when the intermediate container is placed on the flange 203 of the bottom housing, and a side wall 213 that extends upwardly from the floor to about the same height as the tower portion 204. The basket 220, which is porous and preferably made of wire mesh, includes a floor 221 that has an upwardly-domed center portion 222, feet 223 and a cylindrical side wall 224. The basket is shaped such that when positioned within the container 210, its domed center portion 222 will be located above the curved roof of the steam generator assembly 10.

The lid housing 230 includes a cover 231 connected to a rear support bracket 232 so as to be pivotally connected to the upper end of the rear tower portion 204. The cover includes a downwardly-extending rim 233 that is positionable against an upper portion of the intermediate container 210. Mounted within the cover 231 is a heater/convection fan assembly 240 which includes Calrod heater coils 241 located beneath a deflector 242 and a fan blade 243 located within the heater coils and driven by a motor 244. A safety screen 245 is positioned beneath the heater coils and the fan blade.

In operation, food to be cooked is placed in the food basket 220, which is then positioned in the container 210 (if not already located there) and the lid housing 230 is pivoted down such that its rim 231 contacts the upper portion of the container. The appropriate buttons on the front panel portion 205 are pushed to activate the oven. The heater core of the steam generator assembly can be heated such that high latent heat content steam will pass from its head upwardly through the domed center portion 222 of the basket and into and around the food therein. At the same time, the heater coils 241 can be activated and the fan blade 243 rotated by motor 244 such that heated air and steam from around the heater coils will be superheated and blown downwardly and onto the food in the food basket. The superheated steam and entrained air blown downwardly from the heater coils 241 will delay condensation until the steam contacts the surface of the cooking food. The heat/convection fan assembly also enables a post-steaming cycle at increased power after the steam generator assembly 10 is turned off in order to dry and sear the surface of the cooking food and improve its taste and appearance.

FIGS. 9 and 10 depict one embodiment of a steam cooker 300 with retractable steamer rod which includes a steam generator assembly 10 according to the present invention. The steam cooker includes a support housing 301, a food container 350 and an annular juice tray 370.

The support housing 301 includes a base 302 which is positionable on a counter or table top, and a bottom housing 303 which is located above the base, the bottom housing including a cylindrical side wall 304, a radially-inwardly extending rim 305 and a circumferential support flange 306 which extends upwardly from the rim. The bottom housing encloses a bottom housing chamber 307. The rim 305 supports the flange 33 of the (primary) steam generator assembly 10 such that the annular water reservoir is suspended within the bottom housing chamber 307.

The support housing also includes a rear tower 310 located above the base 302, which is formed of a generally cylindrical side wall 311 and a cap 312 that is rotatably connected to the side wall 311. The cap includes a main head 313 and a boom arm 320 which defines a ball socket 321 near its free end that rotatably mounts a ball base 331 of a steamer rod 330. The ball base 331 defines an internal T-channel 332. The main head 313 defines a central vertical channel 314 which can mount the neck 341 of an auxiliary electric steamer canister 340 that is positioned within the side wall 311 of the tower, the central channel also accommodating a stopper 342 which can seal the neck 341. A fluid line 322 extends from the neck 331 to the ball socket 321 to supply steam generated within the auxiliary electric steamer canister 340 to the ball base 331, passing through a control valve 323 mounted on the boom arm 320. Depending on the rotational position of the cap 312 relative to the side wall 311 and the positioning of the steamer rod 330 relative to the boom arm 320, steam supplied to the ball base 331 will either flow through the rod and be ejected from its tip 333 into a mug containing liquid to be steamed or frothed (FIG. 10) or through the ball base itself into the food container 350 (FIG. 9).

The food container 350 includes a lower housing part 351 and an upper housing part 360. The lower housing part 351 includes a cylindrical side wall 352, a floor 353 and a circumferential support flange 354 which extends downwardly from the floor 353 to fit within the circumferential support flange 306 of the bottom housing 303. Extending upwardly from the middle of the floor 353 is a bowl-shaped dome 355. The floor 353 within the support flange 354 and the dome 355 include holes 356 for the passage of steam and liquids therethrough. The upper housing part 360 includes a cylindrical side wall 361, a ceiling 362 mounting an inlet stem 363 and a bowl-shaped dome 364 extending downwardly from the ceiling below the inlet stem 363. The dome 364 includes openings 365 for the passage of steam therethrough.

The annular juice tray 370 fits between the bottom housing 303 and the food container 350 similarly to the way the annular juice tray 130 fits between the bottom housing 101 and the food container 110 in FIG. 4.

Steam of high latent heat content supplied from the primary steam generator assembly 10 will pass through the perforated dome in the bottom wall of the food container and up into the food placed within the food container. Steam generated within the auxiliary electric steamer canister 330 can be supplied through the inlet stem into the dome in the ceiling of the food container (FIG. 9) and then downwardly onto the food in the food container.

Figure 11:
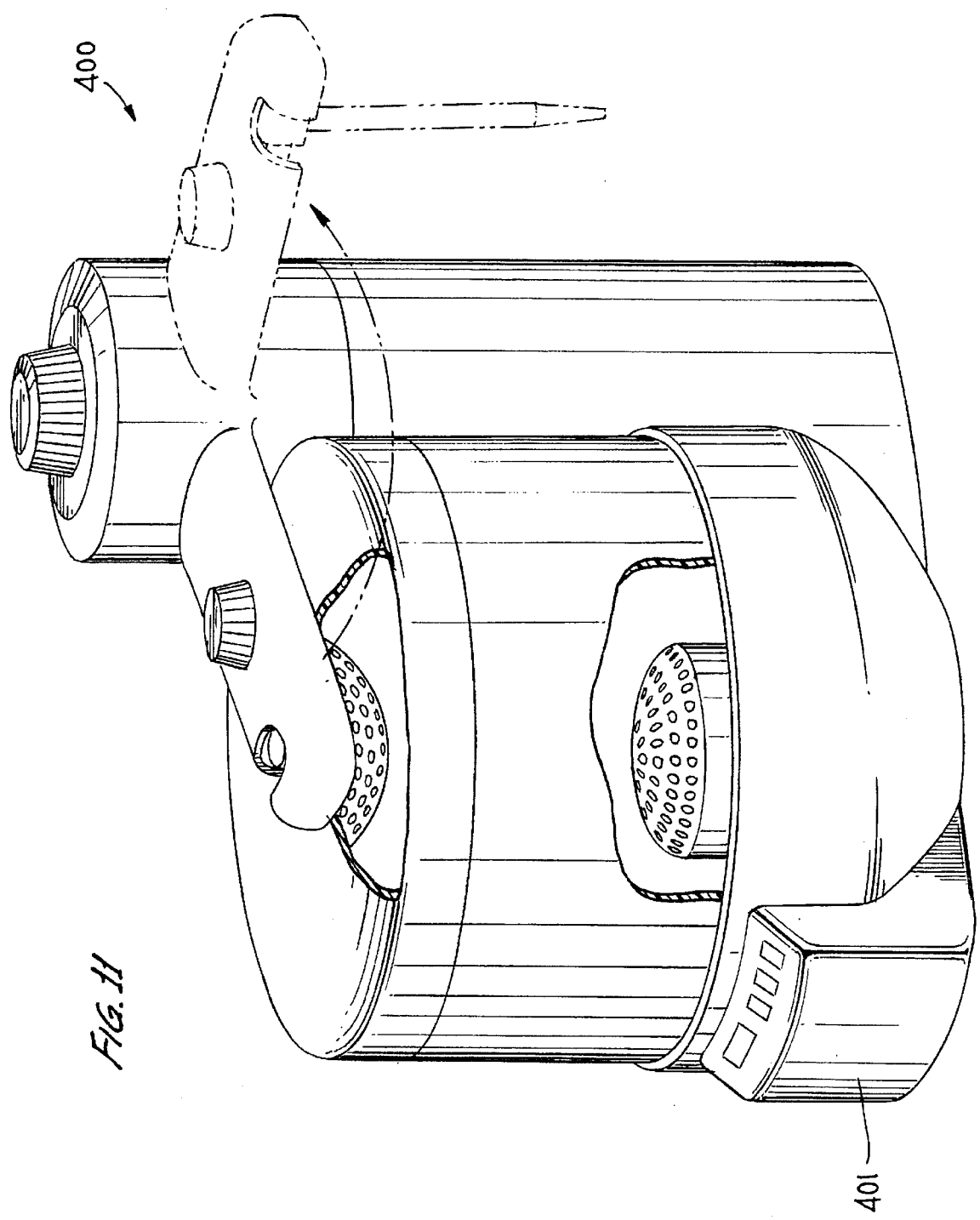
FIG. 11 is a perspective view of an alternative construction of steam cooker with retractable steamer rod, the retractable steamer rod being shown in both its retracted position (solid lines) and in its extended position (phantom lines).

FIG. 11 shows an alternative embodiment of steam cooker with retractable steamer rod, labeled 400, showing the use of a control panel 401.

A steam generator assembly 500 constructed in accordance with a second preferred embodiment of the present invention is depicted in FIGS. 12–16. It includes a thermostat-controlled heater device 520, a vertical steamer tower 530, a distribution manifold 550, and a replaceable water bottle assembly 560.

As seen in FIG. 14, the heater device 520 is similarly constructed to the heater device 20 used in the first preferred embodiment of steam generator assembly depicted in FIGS. 1-3. It includes a disc-shaped mounting plate 521, a platform base 522 and a heater core 524. The mounting plate is generally horizontally oriented and the platform base is centrally mounted on an upper surface thereof, while the heater core is centrally mounted on an upper surface of the platform base. The heater core defines a circumferential skirt which is smaller in diameter than the platform base, thus providing a circumferential ledge 523. The heater core is connectable to an electric power source by a power line (not shown).

The vertical steamer tower 530 includes a base 531, a circular cylindrical lower body 536, a frustoconical connector portion 540, a circular cylindrical upper body 541, and a head 542. The base 531 includes an annular plate 532 whose inner edge extends into a ring gasket 533, and circumferentially spaced-apart legs 534. The mounting plate 521 of the heater device 520 is connected to the legs 534 by screws 535 so as to sealingly position the ring gasket 533 on the ledge 523.

The lower body 536 extends upwardly from the base 531 so as to define a lower portion of a boiler chamber 537 around the heater core 524. As can be seen from FIGS. 14 and 15, a plurality of circumferentially spaced inlet openings 538 are provided in the lower body at a level equal to about half the height of the heater core 524, and a vent opening 539 is provided above the inlet openings 538 at a level about equal to or just below the top end of the heater core. The functioning of openings 538 and 539 will be clarified below.

The upper body 541, which has a smaller diameter than the lower body 536, is located above the lower body and so that its central axis is coincident with the central axis of the lower body, and is connected to the lower body by the frustoconical connector portion 540. The upper body encloses an upper portion of the boiler chamber 537.

The head 542 is located above the upper body 541 to define a head chamber 543, and it includes a horizontally-extending outlet duct 544 which terminates at an end wall 545 having discharge orifices 546 (see also FIGS. 13 and 16).

A disc-like trap element 547 is positionable in the upper body 541 to separate the boiler chamber 537 from the head chamber 543 and help prevent water droplets entrained in steam generated in the boiler chamber from passing upwardly into the head chamber.

The distribution manifold 550 is positioned around the lower body 536 and defines a buffer chamber 559 therein. It includes a bottom wall 551 which is connected to the lower body 536 at a level below the inlet openings 538, a top wall 552 which is connected to the lower body at a level above the vent opening 539, and a side wall 553. As best seen in FIG. 15, the distribution manifold is elongated and provides semicircular ends 550a and 550b. The end 550a, which is positioned around the lower body 536, has a radial center located on the central axis of the lower body, thereby defining as annular channel around a portion of the lower body, and the end 550b is spaced from the lower body and has a radial center located on a vertical line X. The top wall 552 defines an opening 554 centered on vertical line X. A platform 555 is mounted on the top wall and provides an opening 556 which is also centered on vertical line X. The platform is designed to support the water bottle assembly 560.

As best seen in FIG. 14, the water bottle assembly 560 includes a bottle 561 having a handle 562 (see FIG. 17), a threaded neck 563, a cap 564 which is threadingly engageable with the neck 563, and a pipe stem 565 which sealingly extends through a plug 567 sealingly positioned in an opening in the cap. The bottle defines a water chamber 567 therein.

When the water bottle assembly 560 is inverted and positioned on the platform 555, the stem 565 will extend through the openings 556 and 554 to a free end 566 within the buffer chamber 559. Water contained within the bottle 561 (water chamber) will flow through the stem 565 and into the buffer chamber (and from the buffer chamber through inlet openings 538 into the boiler chamber) until the water level rises above the free end 566, thus filling the buffer chamber and the boiler chamber. When electrical power is supplied to the heater core, such that it heats up, the temperature of the water in the boiler chamber will increase, i.e., to boiling, forming steam which fills the boiler chamber and passes through the trap element 547 to fill the head chamber 543. The trap element prevents most of the water droplets entrained in the steam from passing into the head chamber. Because steam cannot escape the head chamber through the discharge orifices 546 as rapidly as it is generated in the boiler chamber, the steam will become pressurized therein, thus increasing its latent heat content. This steam escaping through the discharge orifices 546 will be capable of faster heating of foods than regular steam.

As the water level in the boiler chamber 537 lowers below the top end of the heater core and thus below the vent opening 539, air from the boiler chamber will pass through the vent opening into the buffer chamber, enabling water from the buffer chamber to flow through inlet openings 538 into the boiler chamber, causing the water level in the buffer chamber to fall below the free end 566 of stem 565. Air will then pass upwardly in bubbles through the stem into the bottle 561 to equalize the air pressures above the water levels in the buffer chamber and in the water chamber in the bottle. Water will flow downwardly from the water chamber through the stem into the buffer chamber to again raise the water levels in the buffer chamber and the boiler chamber. This cyclic process of water boiler and replacement will continue until all the water in the bottle assembly has drained out, at which time the water bottle assembly must be replaced.

Because the heater core 524 heats only the water in the boiler chamber and not all the water in the water chamber of the water bottle assembly, steam can be generated very rapidly. This quick boiling can be further enhanced by use of a toroid separator 570 placed within the lower body 536 and around the heater core 524, this separator providing an upflow circulation of water adjacent the heater core which will stabilize the boiling of the water around the heater core.

FIG. 17 depicts a steam convection oven 600 which is connected to the steam generator apparatus 500 of FIGS. 12-16 and FIG. 18 depicts a steamer appliance 700 which contains the apparatus of FIG. 17. The steam convection oven includes an outer housing 601 to which the steam generator assembly 500 is connected, a removable inner bowl 610 which is positionable in the outer housing, and a lid housing 620 which is positionable over the inner bowl and which mounts a heater/convection fan assembly 630.

The outer housing 601 includes a circular floor 602 and a side wall 603 which extends upwardly from the floor and provides a circumferential steam distributor manifold 604 at its upper end. The manifold 604 provides an opening 605 for connection of the outlet duct 544 of the steam generator assembly 500.

The inner bowl 610 has a perforated bottom wall 611 and perforated side wall 612, and the upper end of the side wall is configured to seat on the upper end of the outer housing.

The lid housing 620 includes a cover 621 that is positionable on the outer housing 601 and over the inner bowl 610. The heater/convection fan assembly 630 includes Calrod heater coils 631 located below a deflector 632 and a fan blade 633 which is located above the heater coils and driven by a motor 634. A safety shield 635 is positioned beneath the heater coils and the fan blade.

In operation, food to be cooked is placed in the inner bowl 610, which is then positioned in the outer housing 601 (if not already located therein) and the lid housing 620 is positioned thereover. Suitable control buttons are pushed to activate the steam generator assembly 500 and, if desired, the oven. Steam from the steam generator assembly 500 will pass into the distribution manifold 604, downwardly between the inner bowl and the outer housing, and through the perforations in the side wall 612 of the inner bowl and its bottom wall 611 to steam the food contained in the inner bowl.

Simultaneously or thereafter, the heater coils 631 can be activated and the fan blade 633 rotated by motor 634 such that heated air and steam from around the heater coils will be superheated and blown downwardly and onto food in the inner bowl to dry and seal the cooked food. Condensate and drippings will flow downwardly through the perforations in the bottom wall 611 and collect on the floor 602 of the outer housing.

The steamer appliance which contains the apparatus of FIG. 17 (see FIG. 18) can include a timer 701 and an on light 702.

Although specific embodiments of the inventive steam generator assembly and steam cooker using same have been shown and described, modifications therein can be made and still fall within the scope of the appended claims.

We claim:

1. A steam generator assembly for use in steam cooking appliances and which is capable of quickly generating a constant supply of steam having a high latent heat content, said steam generator assembly comprising:

an electric heater device which includes a heater core defining a top end, first chamber means which defines a boiler chamber around said heater device and a head chamber above the boiler chamber, said head chamber including an end wall with discharge orifices therein, second chamber means defining a buffer chamber around said boiler chamber, water reservoir means defining a water chamber containing water, first inlet means for delivering water from said buffer chamber into said boiler chamber, first vent means for equalizing gas pressures above water levels in said boiler chamber and said buffer chamber and for enabling water from said buffer chamber to flow through said first inlet means from said buffer chamber into said boiler chamber, said first vent means being above said first inlet means, and means for providing communication between said water chamber and said buffer chamber for enabling water to flow from said water chamber to said buffer chamber and for enabling gas to pass from said buffer chamber into said water chamber to equalize gas pressures above water levels therein.

2. A steam generator assembly according to claim 1, wherein said water reservoir means comprises an annular water reservoir which is positioned around said electric heater device and is connected to said electric heater device, said water reservoir including a top wall, a side wall and a bottom wall, wherein said first and second chamber means comprise a steamer insert which is removably positioned within and connectable to said annular water reservoir; said steamer insert including an annular flange which is sealingly connectable to said top wall of said annular water reservoir, a head which extends upwardly from an inner circumferential edge of said flange, said head enclosing said head chamber and providing said end wall with discharge openings therein as a perforated roof, outer and inner circumferential walls which extend downwardly from said flange and around said heater core, said inner wall defining said boiler chamber around said heater core and said outer wall defining said buffer chamber around said inner wall.

3. A steam generator assembly according to claim 2, wherein said first inlet means comprise a first channel opening near a lower end of said inner wall, wherein said first vent means comprise a first vent opening in said inner wall above said first channel opening and generally level with said top end of said heater core, and wherein said means for providing communication between said water chamber and said buffer chamber comprise a second channel opening near a lower end of said outer wall and a second vent opening in said outer wall above said second channel.

4. A steam generator assembly according to claim 3, including a trap element positioned between said boiler chamber and said head chamber to prevent water droplets entrained in steam generated in said boiler chamber from passing into said head chamber.

5. A steam generator assembly according to claim 4, wherein said trap element includes a plurality of annular, upwardly tapering frustoconical vanes.

6. A steam generator assembly according to claim 3, wherein said second channel opening is diametrically opposite said first channel opening.

7. A steam generator assembly according to claim 3, wherein said bottom wall of said water reservoir includes a circumferential inner edge connected to a sealing ring that sealingly abuts said electric heater device, and wherein said inner circumferential wall contacts said sealing ring except for a circumferential portion which defines said second channel opening.

8. A steam generator assembly according to claim 2, wherein said top wall of said water reservoir includes a filler neck, and including a fill cap for sealingly closing said filler neck.

9. A steam generator assembly according to claim 2, wherein the top wall of said water reservoir defines a radially inwardly-extending circumferential L-shaped lip portion and wherein said annular flange of said steamer insert fits within said L-shaped lip portion.

10. A steam generator assembly according to claim 9, wherein said L-shaped lip portion of the top wall of said water reservoir includes circumferentially spaced slots and wherein said steamer insert includes circumferentially spaced teeth extending outwardly from said outer wall thereof to enable a bayonet connection between said steamer insert and said water reservoir.

11. A steam generator assembly according to claim 1, wherein said first chamber means comprises a vertical steamer tower having a lower and upper circular cylindrical bodies defining said boiler chamber around said heater core, and a head defining said head chamber above said boiler chamber, said head including a duct which terminates at said end wall with discharge orifices therein.

12. A steam generator assembly according to claim 11, wherein said second chamber means comprises an elongated distribution manifold with opposite first and second ends, said first end being located around and connected to said lower body of said vertical steamer tower and said second end being located remote therefrom.

13. A steam generator assembly according to claim 12, wherein said first inlet means comprises a plurality of circumferentially spaced openings in said lower body of said vertical steamer and wherein said first vent means comprises a vent opening in said lower body.

14. A steam generator assembly according to claim 13, wherein said water reservoir means comprises a replaceable water bottle assembly which can be mounted on said distribution manifold to supply water to the buffer chamber therein, said water bottle assembly including a bottle defining a water chamber therein, a threaded neck and a threaded cap.

15. A steam generator assembly according to claim 14, wherein said means for providing communication between said water reservoir and said buffer chamber comprises a pipe stem which sealingly extends through a said cap.

16. A steam generator assembly according to claim 15, wherein said distribution manifold defines an opening in a top wall thereof at said second end, wherein a platform is mounted on said top wall at said second end, and wherein said water bottle assembly, when inverted, is mountable on said platform so that said pipe stem thereof extends through said opening in said top wall to a free end located in said buffer chamber.

17. A steam generator assembly according to claim 11, including a toroid separator positioned within said vertical steamer tower and around said heater core.

18. A steam generator assembly according to claim 11, including a trap element positioned within said vertical steamer tower and between said boiler chamber and said head chamber to prevent water droplets entrained in steam generated in said boiler chamber from passing into said head chamber.

* * * * *